(12) United States Patent
Lu et al.

(10) Patent No.: US 6,603,748 B1
(45) Date of Patent: Aug. 5, 2003

(54) SYSTEM AND METHOD FOR PREVENTION OF REVERSE JAMMING DUE TO LINK IMBALANCE IN WIRELESS COMMUNICATION SYSTEMS

(75) Inventors: Ming Lu, Piscataway, NJ (US); Wen-Yi Kuo, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/288,363

(22) Filed: Apr. 8, 1999

(51) Int. Cl.⁷ .................................................. H04Q 7/00
(52) U.S. Cl. ....................... 370/329; 370/229; 455/450; 455/509
(58) Field of Search ................................ 370/229, 230, 370/232, 233, 234, 236, 328, 329; 455/550, 450, 509, 517

(56) References Cited

U.S. PATENT DOCUMENTS

| | | | |
|---|---|---|---|
| 5,638,408 A | * | 6/1997 | Takaki ........................ 375/341 |
| 5,640,414 A | | 6/1997 | Blakeney, II et al. ....... 375/200 |
| 5,809,422 A | | 9/1998 | Raleigh et al. ............. 455/449 |
| 5,884,187 A | | 3/1999 | Ziv et al. |
| 6,021,122 A | * | 2/2000 | Tiedemann et al. ......... 370/331 |
| 6,219,343 B1 | * | 4/2001 | Honkasalo et al. ......... 370/335 |

FOREIGN PATENT DOCUMENTS

| | | |
|---|---|---|
| EP | 0504122 A | 9/1992 |
| EP | 0767548 A | 9/1997 |
| WO | WO9835514 A | 8/1998 |
| WO | WO9909779 A | 2/1999 |

* cited by examiner

*Primary Examiner*—Thanh Cong Le
*Assistant Examiner*—Lana Le

(57) ABSTRACT

The invention provides a power control methodology that increases the performance and the throughput of wireless communication systems. In particular, the invention provides a reverse jamming prevention process that efficiently utilizes power resources in a communication system such as CDMA. The invention advantageously prevents reverse jamming due to link imbalance that results from differences in forward and reverse link coverage. According to the invention, an evaluation set (e-set), which is a super set of the active set of base transceiver stations serving specific users, is determined to prevent the negative effects of reverse jamming. Excessive interference problems in the reverse link, particularly in high-speed wireless systems, are thus avoided.

22 Claims, 2 Drawing Sheets

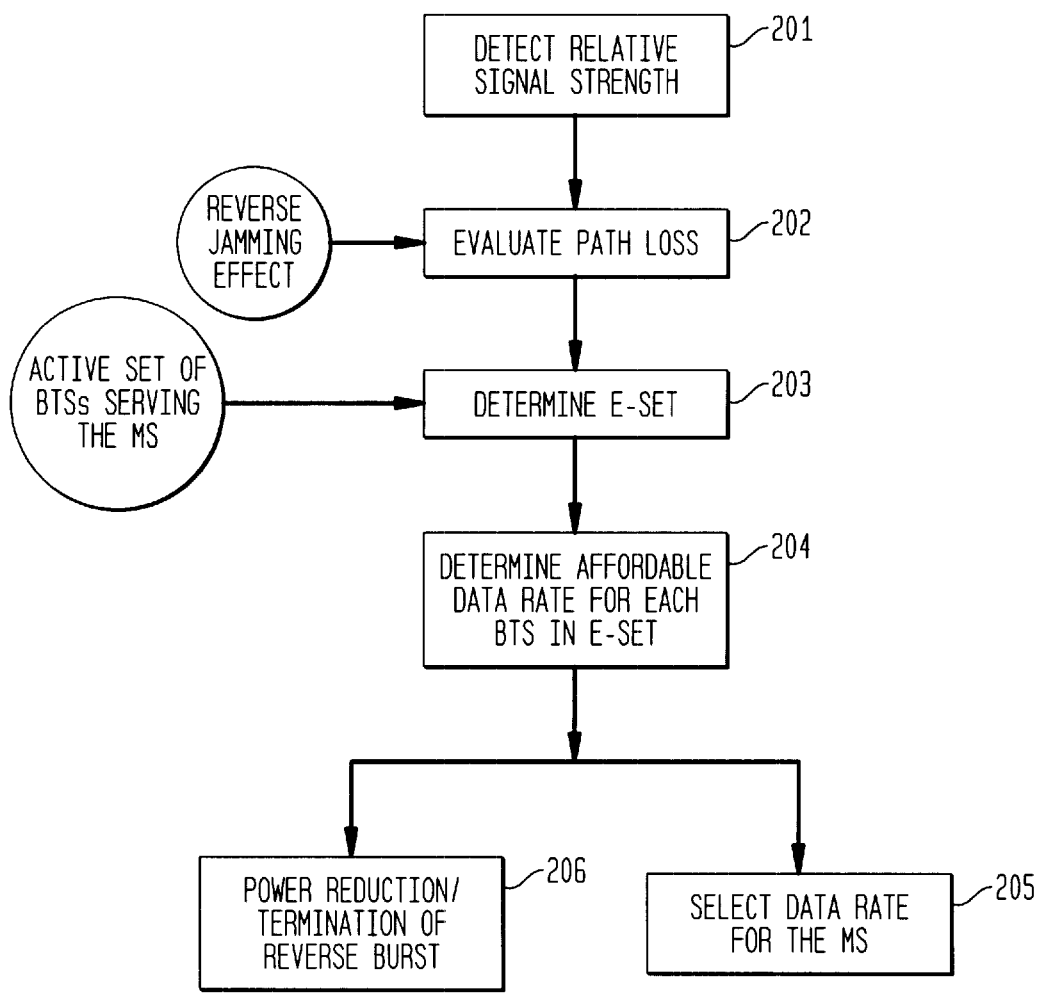

SYSTEM AND METHOD FOR PREVENTION OF REVERSE JAMMING DUE TO LINK IMBALANCE IN WIRELESS COMMUNICATION SYSTEMS

RELATED APPLICATIONS

The invention is related to U.S. patent application Ser. No. 09/288,364, filed concurrently herewith, entitled INTELLIGENT BURST CONTROL FUNCTIONS FOR WIRELESS COMMUNICATION SYSTEMS, U.S. patent application Ser. No. 09/288,365, entitled METHOD FOR PREMATURE TERMINATION OF BURST TRANSMISSION IN WIRELESS COMMUNICATION SYSTEMS, filed concurrently herewith, U.S. patent application Ser. No. 09/288,587, entitled BURST DURATION ASSIGNMENT BASED ON FADING FLUCTUATION AND MOBILITY IN WIRELESS COMMUNICATION SYSTEMS, filed concurrently herewith, U.S. patent application Ser. No 09/288,368, entitled A METHOD OF QUEUE LENGTH BASED BURST MANAGEMENT IN WIRELESS COMMUNICATION SYSTEMS, filed concurrently herewith, U.S. patent application Ser. No. 09/288,006, entitled A METHOD OF DYNAMICALLY ADJUSTING THE DURATION OF A BURST TRANSMISSION IN WIRELESS COMMUNICATION SYSTEMS, filed concurrently herewith, all of which are assigned to the same assignee and are incorporated by reference herein.

FIELD OF THE INVENTION

The invention relates to wireless communication systems and, more particularly, to the prevention of reverse jamming in such systems.

BACKGROUND OF THE INVENTION

Wireless communication systems have been developed to allow transmission of information signals between an originating location and a destination location. Both analog (first generation) and digital (second generation) systems have been used to transmit such information signals over communication channels linking the source and destination locations. Digital methods tend to afford several advantages relative to analog techniques, including, e.g., improved immunity to channel noise and interference, increased capacity, and improved security of communication through the use of encryption.

While first generation systems were primarily directed to voice communication, second generation systems support both voice and data applications. Numerous techniques are known in second-generation systems for handling data transmissions which have different transmission requirements. Several modulation/coding arrangements have been developed for wireless systems based on multiple access techniques, e.g., frequency division multiple access (FDMA), time division multiple access (TDMA) and code division multiple access (CDMA). In FDMA techniques, each user is allocated one or more specific sub-bands of frequency. In TDMA techniques, periodically recurring time slots are identified, and for each segment of time each user is allocated one or more time slots. CDMA systems provide reduced multiple path distortion and co-channel interference and reduce the burden of frequency/channel planning that is common with FDMA and TDMA systems.

In a CDMA system, a unique binary spreading sequence (a code) is assigned for each call to each user. Multiplied by the assigned code, the user's signal is spread unto a channel bandwidth much wider than the user signal bandwidth. The ratio of the system channel bandwidth to the user's bandwidth is commonly called the spreading gain. All active users share the same system channel bandwidth frequency spectrum at the same time. Calculating the signal-to-interference (S/I) ratio determines the connection quality of the transmission link. Given a required S/I ratio, the system capacity is proportional to the spreading gain. The signal of each user is separated from the others at the receiver by using a correlator keyed with the associated code sequence to de-spread the desired signal.

First-generation analog and second-generation digital systems were designed to support voice communication with limited data communication capabilities. Third-generation wireless systems, using wide-band multiple access technologies such as CDMA, are expected to effectively handle a large variety of services, such as voice, video, data and imaging. Among the features which will be supported by third-generation systems is the transmission of high-speed data between a mobile terminal and a land-line network. As is known, high-speed data communications is often characterized by a short transmission "burst" at a high data transmission rate, followed by some longer period of little or no transmission activity from the data source. To accommodate the bursty nature of such high-speed data services in third-generation systems, it is necessary for the communications system to assign a large bandwidth segment (corresponding to the high data rate) from time to time for the duration of the data burst. With the ability of the third generation systems to handle such bursty high-speed data transmission, throughput and delay for users can be advantageously improved. However, because of the large amount of instantaneous bandwidth required for transmission of a burst of high-speed data, the management of such bursts, and particularly the allocation of power and system resources thereto, must be handled with care to avoid unwarranted interference with other services using the same frequency allocation. Consequently, system designers need to deal with many issues in setting efficient data rates for different types of communications via a wireless link, including appropriate allocation of system resources for the bursts of data experienced with high-speed data service.

There is a continuing need to increase the performance and improve the throughput of wireless communication systems. In particular, when allocating transmission resources, a methodology is needed to avoid interference problems between users operating with different power levels in the wireless communication system.

SUMMARY OF THE INVENTION

The invention provides a novel power control methodology that increases the performance and the throughput of wireless communication systems. In particular, the invention operates to avoid reverse link jamming due to non-symmetrical power relations among transmitter-receiver pairs operating in the wireless system. In particular, the invention advantageously prevents reverse jamming due to link imbalance that results from differences in forward and reverse link coverage. According to the invention, an evaluation set (e-set), which is a super set of the active set of base transceiver stations serving a specific user, is determined and power relations managed among the BTSs, comprising the e-set to prevent the negative effects of reverse jamming. Power overloading and interference problems, particularly in high-speed wireless systems, are thus avoided.

According to the methodology of the invention, the relative signal strength received at the MS from neighboring BTSs is first detected. The path loss of a transmission path is then evaluated by monitoring and measuring the reverse jamming effect in the BTSs. BTSs which are not in the active set of BTSs in communication with the particular MS are combined with the active set, to produce a super set of BTSs called an evaluation set, or e-set. An affordable data rate is determined for each of the BTSs in the e-set in communication with the MS. A data rate is then determined for transmission of data between the BTSs in the e-set and the MS by selecting the minimum affordable data rate of BTSs in the e-set. A reverse link transmission may be terminated or a power reduction directed, if reverse channel jamming for a BTS in the e-set is detected, thereby avoiding overloading in the reverse link and excessive interference problems.

BRIEF DESCRIPTION OF THE DRAWINGS

FIG. 2 is a flow diagram illustrating the methodology of the invention.

DETAILED DESCRIPTION

Figure 1:
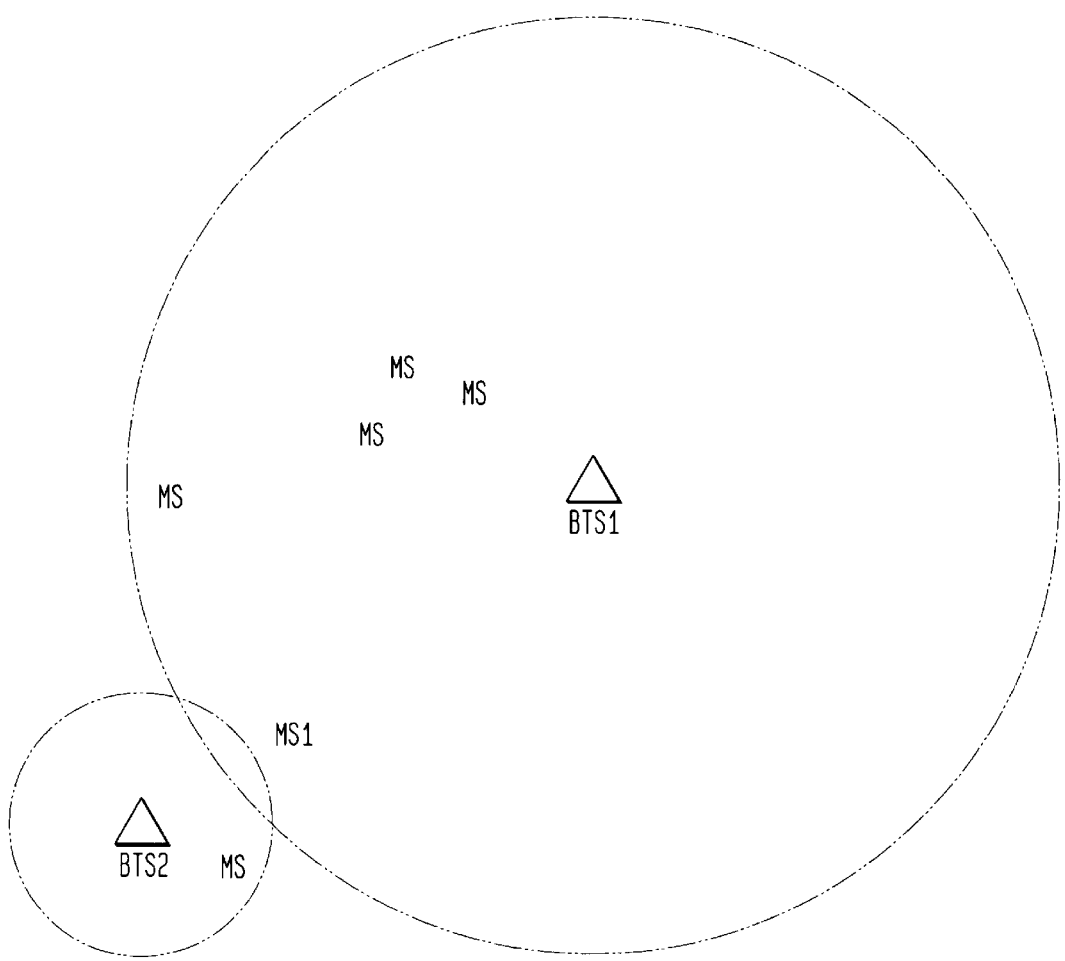
FIG. 1 is illustrates a reverse link power imbalance scenario relating to the invention.

The focus of early wireless systems, particularly first-generation analog systems, was primarily voice communication. With second-generation wireless systems, including CDMA, TDMA and Global System for Mobile Communications (GSM), came varying degrees of improvement in terms of voice quality, network capacity and enhanced services. However, while second-generation systems are suitable to the provision of voice, low rate data, fax and messaging, they are generally not able to effectively address requirements for high-speed mobile data rates. The evolution to third-generation wireless communications represents, essentially, a paradigm shift to the world of multimedia mobile communications, where users will have access not just to voice services but also to video, image, text, graphic and data communications. The third-generation networks are expected to provide mobile users with data rates of between 144 Kbps and 2 Mbps.

Nonetheless, in wireless networks supporting higher speed data communications applications, burst transmissions must be managed very carefully to avoid power overload or unacceptable interference when handling higher speed applications and other applications (e.g., voice calls). As will be shown hereafter, the invention provides a novel methodology that increases the performance of wireless communication systems by managing the assignment of burst transmissions with respect to such higher speed data applications so as to reduce intra-system interference. Although the invention will be hereafter described in terms of a preferred embodiment based on CDMA encoding of the wireless signals, it should be apparent that the methodology of the invention can also be applied for other wireless channelization arrangements, including TDMA and GSM.

In the establishment of a wireless communication system, system designers may configure various cell sizes (such as macrocells and microcells) and different transmission power levels, depending on coverage considerations. For example, in an area such as a valley where there is a shortfall in coverage, microcells of small sizes and relatively lesser transmission power may be installed to ensure satisfactory transmission quality. In a high-traffic area such as an airport terminal, microcells may be configured within macrocells to enhance transmission capacity. Furthermore, specific cells may be configured to operate at reduced power levels because of power optimization considerations. As a result, base transceiver stations (BTSs) in neighboring cells (or sectors) may be transmitting at significantly different power levels due to power optimization and/or coverage enhancement considerations.

As can thus be seen, it is not unusual for neighboring cells/sectors to be using different maximum forward-link transmit power. However, the reverse link for each of the neighboring BTSs, being established by an MS radiating the same power in an essentially omni-directional pattern, can still have roughly the same coverage in a cell having low forward-link power and a neighboring cell having high forward link power. The phenomenon of forward and reverse link coverage being non-symmetric among neighboring cells is often characterized as link imbalance.

For the low-power cell, this reverse-link power transmission from an MS in a link-imbalance situation can cause serious interference problems for other MSs served by that cell's BTS. Specifically, such a link-imbalanced MS may be within the same proximity of the low-power BTS as for MSs served by that BTS, but transmitting at substantially higher power than those other MSs. In that circumstance, the transmitted power from the link-imbalance MS is likely to jam the reverse-link signals of the other MSs and thereby substantially diminish the signal quality of transmissions from those MSs to their serving BTS. This problem will be particularly acute when the link-imbalance MS is actively transmitting high-speed data, which uses a higher transmitting power than voice or other lower data-rate signals, and is thus even more likely to cause reverse-link jamming for MSs in a low-power cell.

FIG. 1 illustrates an exemplary link imbalance scenario with a macrocell (served by a BTS named BTS1) and a microcell (served by a BTS named BTS2) whose coverage areas overlap. Referring to the figure, mobile stations (MS) are located throughout the coverage areas of BTS1 and BTS2. In particular, MS1 is situated within the coverage area of BTS1 but outside of the coverage area of BTS2. BTS2, serving the microcell, has lesser transmission power because of its small coverage area.

Even though MS is physically closer to the microcell (served by BTS2), the signal strength received by MS1 from BTS2 can be quite low relative to that received from BTS1. Since BTS1 (serving the macrocell) operates with higher transmission power, the relative signal strength received by MS1 from BTS1 may well be stronger than that received from BTS , even though MSis considerably closer to BTS2. Consider, for example, the case of the forward transmission power of BTS2, serving the microcell, being 10 dB (decibel) lower than that of BTS1, serving the macrocell. Consider further that BTS2 has 6 dB less path loss to the MS compared to that from BTS1 because MS1 is physically closer to BTS2. Therefore, in terms of relative signal strength, MS1 receives a signal from BTS2 (microcell) which is 4 dB less than that received from BTS1 (macrocell). Based on signal strength measurements in the forward link, MS1 thus appears to be far away from BTS2 and therefore may not be included in the active set of BTSs serving MS1. In that circumstance, BTS2 will not have any power control relationship with MS1 and accordingly no basis for directing MS1 to use a lower transmit power (not withstanding that MS1 may be transmitting with sufficient power to seriously degrade communications between BTS2 and its served MSs).

According to the methodology of the invention, an evaluation set (e-set) of BTSs is selected, which is a super set of an active set of BTSs serving a particular MS. The impact of reverse-link jamming is then evaluated with respect to each of the BTSs in the e-set. Because of link imbalance, monitoring and detecting the relative signal strength in the forward link cannot accurately reflect the actual physical location of the MS with respect to a particular BTS. Path loss in the reverse link is a better and more accurate indication of the physical location of the MS with respect to the BTSs. BTSs having relatively less reverse link path loss (such as BTS2 serving the microcell in FIG. 1) are included in the e-set. The methodology of the invention is hereinafter described in further detail.

FIG. 2 is a flow diagram illustrating the methodology of the invention. Referring to the figure, the relative signal strength received at the MS from neighboring BTSs is detected in Step 201. By monitoring and measuring the reverse jamming effect in the BTSs, the path loss of a transmission path is evaluated in Step 202. In Step 203, BTSs which are not in the active set of BTSs in communication with the particular MS are combined with the active set, to produce a super set of BTSs called an evaluation set, or e-set. In Step 204, an affordable data rate is determined for each of the BTSs in the e-set in communication with the MS. In Step 205, a data rate is determined for transmission of data between the BTSs in the e-set and the MS by selecting the minimum affordable data rate of BTSs in the e-set. Referring to Step 206, a reverse link transmission may be terminated—particularly a high-power, high-data-rate transmission—or a power reduction directed, if reverse channel jamming for a BTS in the e-set is detected. Interference problems when transmitting high-speed data in the reverse link may thereby be largely avoided.

Referring to Step 201 of FIG. 2, the relative signal strength is detected by monitoring and reporting the forward pilot $E_c/I_o$, (or relative signal strength) received at the MS from neighboring BTSs. The neighboring BTSs are BTSs in the geographical proximity of the MS, but may or may not be in the active set of BTSs that are in communication with the MS.

A particular criterion for incorporating a BTS into the e-set is the path loss threshold. In an illustrative embodiment, the path loss threshold may be determined in relation to measuring the reverse jamming effect. The BSC (Base Station Controller) can instruct the MS to report the power measurements which are above a certain threshold (e.g., T_report) along with a burst transmission request in the reverse link. For the described illustrative embodiment in a case where a threshold set for soft handoff (T_add) is established at −14 dB, the threshold (T_report) might be selected to be −19 dB.

Referring to Step 202 of FIG. 2, the BSC then performs the calculation of the reverse jamming effect for the BTSs in evaluating the path loss. One way of defining the reverse jamming effect is to measure the relative reverse net path loss for the BTSs, which is:

$$J\_k = RxE_c/I_o - BTS\_k Tx - BTS\_k \text{ floor}$$

$$J\_\max = \max \text{ over } k \text{ of } J\_k$$

where J_k is the jamming effect in the transmission path between a particular BTS (k) and the MS, J_max is the maximum jamming effect in the transmission path between the BTS(k), Rx $E_c/I_o$ is the relative signal strength received at the MS, BTS_k Tx is the transmission power of the BTS (k), and BTS_k floor is the noise floor of the BTS(k) including the injected noise for desensitization purposes. The reverse jamming effect of the BTSs is measured in dB.

Referring to Step 203 of FIG. 2, an evaluation set (e-set) of BTSs is determined from a super set of BTSs that include the active set of BTSs in communication with the MS. Using the jamming effect calculated for the BTS(k), the e-set can be expressed in the following:

$$\text{E-set} = \{BTS\_k | J\_\max - J\_k <= \Delta\}$$

where $\Delta$ is the relative jamming effect threshold. In general, the relative jamming effect threshold is in the range of 2 to 5 dB. The e-set includes BTSs in the active set, and any BTS with a maximum jamming effect within the range of the relative jamming effect threshold ($\Delta$).

Referring to Step 204 of FIG. 2, an affordable data rate is determined for each of the BTSs in the e-set in communication with the MS. For each BTS in the e-set, the BSC calculates the affordable data rate as follows:

$$R_{max} = \frac{(L_{UP} - L)W \cdot \textit{finger efficiency}}{\left(\textit{adjusted } \frac{E_b}{N_t}\right)}$$

where L is the current reverse link loading estimation, W is the frequency bandwidth (e.g., 3.75 MHz), $L_{UP}$ is the tolerable upper bound of reverse loading, finger efficiency is the ratio of energy received by the rake receiver in the MS to the actual total energy, and adjusted $E_b/N_t$ is the power adjustment. Note that all terms in this requirement are linear (not in dB). Conversion from log value to linear value is required for expressing the terms in dB. The adjusted $E_b/N_t$, is determined as follows:

If the BTS is in the active set, $$\textit{adjusted } \frac{E_b}{N_t} = \textit{measured pilot SIR} \cdot \frac{\text{pilot\_rate}}{\text{CH\_rate}} \cdot \frac{\text{CH\_power}}{\text{pilot\_CH\_power}} \cdot 10^{0.1*\text{Offset\_RP}}$$

where pilot_rate is the inverse of the pilot integration period, measured pilot SIR is for the reverse link pilot, OFFSET_RP (in dB) is a parameter to account for the difference in reverse power requirement due to the difference in target FER (frame error rate) and coding structure and the channel rate.

If the BTS is NOT in the active set, $$\textit{adjusted } E_b/N_t =$$

$$\textit{adjusted } \frac{E_b}{N_t} = \frac{(\textit{adjusted } E_b/N_t \text{ at the strongest } BTS \text{ in the active set})^*}{\textit{measured pilot SIR} \cdot \frac{\text{pilot\_rate}}{\text{CH\_rate}} \cdot \frac{\text{CH\_power}}{\text{pilot\_CH\_power}} \cdot 10^{0.1*\text{Offset\_RP}}}$$

Referring to Step 205 of FIG. 2, the minimum of the affordable data rates of BTSs in the e-set is selected as the data rate for transmission of data between the BTSs in the e-set and the MS. Operation of the method of the invention can be described in terms of an exemplary active set of {A, B}, where A and B are BTSs serving a particular MS. According to the invention, BTSs in the geographical area proximate to the MS are monitored for reverse jamming effect. For this example, it is determined that the reverse link jamming effect at C is significant and over a predetermined path loss threshold. An e-set is then constructed, which comprises the set of BTSs {A, B, C}. A reverse link data rate is selected for the e-set as the minimum of the data rate which each BTS in the e-set can tolerate with experienced reverse-link jamming. Algebraically, that acceptable data rate would be stated as:

$$R=\min\{R_A, R_B, R_C\}$$

Referring to Step 206 of FIG. 2, in the event that a BTS in the e-set is experiencing problems due to strong interference in the reverse link for served MSs, the BTS can notify the base station controller (BSC) in the wireless system to adjust the transmission power of the offending MS or cause it to terminate the particular burst transmission. Note that the method of the invention applies not only to burst transmissions but also to resolving channel interference with MSs operating at lower power output. Interference problems of reverse data transmissions with MSs which do not have any power control relationship with the BTS due to link imbalance are thus avoided.

Those skilled in the art will recognize that there are many configurations of wireless systems not specifically described herein but for which the methodology of the invention may be applied. Although the invention is described in its preferred embodiments, it is not intended to limit the invention to the precise embodiments disclosed herein. In particular, the invention can be utilized for third-generation mobile or personal communication systems that offer a multitude of data services in different operating scenarios, such as telephony, teleconference, voice mail, program sound, video telephony, video conference, remote terminal, user profile editing, telefax, voiceband data, database access, message broadcast, unrestricted digital information, navigation, location and Internet access services. The methodology of the invention can also be utilized in second-generation systems, or any system that has burst transmission capability.

Accordingly, this description is to be construed as illustrative only. Those skilled in this technology can make various alterations and modifications without departing from the scope and spirit of this invention. Therefore, the scope of the invention shall be defined and protected by the following claims and their equivalents. The invention is to be accorded the widest scope consistent with the principles and novel features disclosed herein. The exclusive use of all modifications within the scope of the claims is reserved.

We claim:

1. A communication method for a wireless system having a plurality of base transceiver stations operative to serve a plurality of mobile stations, the base transceiver stations (BTS) and the mobile stations (MS) forming a plurality of BTS-MS transmission paths, wherein an active set of base transceiver stations is determined with respect to at least one of the plurality of mobile stations, the method comprising the steps of:

creating an evaluation set of base transceiver stations corresponding to a mobile station;

determining an affordable data rate for each base transceiver station in the evaluation set; and selecting a data rate from the affordable data rates of the base transceiver stations in the evaluation set;

wherein the evaluation set is determined as a function of reverse link path loss and includes the base transceiver stations in the active set.

2. The method in claim 1, further comprising the step of evaluating reverse jamming effect in the plurality of BTS-MS paths, wherein the evaluation set is determined based on the evaluated reverse jamming effect.

3. The method in claim 1, further comprising the steps of:

monitoring power measurements of at least one of the plurality of BTS-MS paths; and adjusting transmitted power for the mobile station based on the monitored power measurements.

4. The method in claim 1, further comprising the steps of:

monitoring data rates in the BTS-MS paths served by the evaluation set of base transceiver stations; and selecting a minimum data rate from the monitored data rates as a data rate for the BTS-MS paths served by the evaluation set.

5. The method in claim 1, further comprising the steps of:

detecting a relative signal strength of a base transceiver station received at a mobile station;

detecting a transmission power of the base transceiver station;

detecting a noise floor of the base transceiver station; and evaluating reverse jamming effect of the base transceiver station.

6. The method in claim 1, further comprising the step of evaluating reverse jamming effect of a base transceiver station, wherein the reverse jamming effect is evaluated according to a function of:

$$J\_k = Rx E_c/I_o - BTS\_k Tx - BTS\_k \text{ floor}$$

where $J\_k$ is a jamming effect in a BTS-MS path between a base transceiver station and a mobile station, $Rx\ E_c/I_o$ is a relative signal strength received at the mobile station, $BTS\_k\ Tx$ is transmission power of the base transceiver station, and $BTS\_k$ floor is a noise floor of the BTS-MS path.

7. The method in claim 1, wherein the evaluation set is determined according to:

$$\text{E-set} = \{BTS\_k | J\_\max - J\_k <= \Delta\}$$

where $BTS\_k$ is a base transceiver station, $J\_\max$ is a maximum jamming effect of a BTS-MS path between the base transceiver station and a mobile station, $J\_k$ is a jamming effect in the BTS-MS path, and $\Delta$ is a relative jamming effect threshold.

8. The method in claim 1, further comprising the steps of:

monitoring power measurements of at least one BTS-MS path; and evaluating reverse jamming effect in the at least one BTS-MS path.

9. The method in claim 1, wherein the affordable data rate is determined according to:

$$R_{max} = \frac{(L_{UP} - L - L_{\text{exitsing\_data}})W \cdot finger\ efficiency}{\left(adjusted\ \frac{E_b}{N_t}\right)}$$

where L is a current reverse link loading estimation, W is a frequency bandwidth, $L_{UP}$ is a tolerable upper bound of reverse loading, finger efficiency is a ratio of energy received by a rake receiver in a mobile station to actual total energy, and adjusted $E_b/N_t$ is a power adjustment.

10. The method in claim 1, wherein the system is a code division multiple access (CDMA) system with a forward link and a reverse link.

11. A wireless system having a plurality of base transceiver stations operative to serve a plurality of mobile stations, the base transceiver stations (BTS) and the mobile stations (MS) forming a plurality of BTS-MS transmission paths, wherein an active set of base transceiver stations is determined with respect to at least one of the plurality of mobile stations, the system comprising:

an evaluation set of base transceiver stations corresponding to a mobile station;

means for determining an affordable data rate for each base transceiver station in the evaluation set; and means for selecting a data rate from the affordable data rates of the base transceiver stations in the evaluation set;

wherein the evaluation set is determined as a function of reverse link path loss and includes base transceiver stations in the active set.

12. The system in claim 11, further comprising means for evaluating reverse jamming effect in the plurality of BTS-MS paths, wherein the evaluation set is determined based on the evaluated reverse jamming effect.

13. The system in claim 11, further comprising:

means for monitoring power measurements of at least one of the plurality of BTS-MS paths; and means for adjusting transmitted power for the mobile station based on the monitored power measurements.

14. The system in claim 11, further comprising:

means for monitoring data rates in the BTS-MS paths served by the evaluation set of base transceiver stations; and means for selecting a minimum data rate from the monitored data rates as a data rate for the BTS-MS paths served by the evaluation set.

15. The system in claim 11, further comprising:

means for detecting a relative signal strength of a base transceiver station received at a mobile station;

means for detecting a transmission power of the base transceiver station;

means for detecting a noise floor of the base transceiver station; and means for evaluating reverse jamming effect of the base transceiver station.

16. The system in claim 11, further comprising means for evaluating reverse jamming effect of a base transceiver station, wherein the reverse jamming effect is evaluated according to a function of:

$$J\_k = RxE_c/I_o - BTS\_k Tx - BTS\_k \text{ floor}$$

where J_k is a jamming effect in a BTS-MS path between a base transceiver station and a mobile station, Rx $E_c/I_o$ is a relative signal strength received at the mobile station, BTS_k Tx is transmission power of the base transceiver station, and BTS_k floor is a noise floor of the BTS-MS path.

17. The system in claim 11, wherein the evaluation set is determined according to:

$$\text{E-set} = \{BTS\_k | J\_\max - J\_k <= \Delta\}$$

where BTS_k is a base transceiver station, J_max is a maximum jamming effect of a BTS-MS path between the base transceiver station and a mobile station, J_k is a jamming effect in the BTS-MS path, and Δ is a relative jamming effect threshold.

18. The system in claim 11, further comprising:

means for monitoring power measurements of at least one BTS-MS path; and means for evaluating reverse jamming effect in the at least one BTS-MS path.

19. The system in claim 11, wherein the affordable data rate is determined according to:

$$R_{max} = \frac{(L_{UP} - L - L_{\text{exitsing\_data}}) W \cdot \text{finger efficiency}}{\left(\text{adjusted } \frac{E_b}{N_t}\right)}$$

where L is a current reverse link loading estimation, W is a frequency bandwidth, $L_{UP}$ is a tolerable upper bound of reverse loading, finger efficiency is a ratio of energy received by a rake receiver in the mobile station to actual energy, and adjusted $E_b/N_t$ is a power adjusted.

20. The system in claim 11, wherein the system is a code division multiple access (CDMA) system with a forward link and a reverse link.

21. A communication method for a wireless system having a plurality of base transceiver stations operative to serve a plurality of mobile stations, the base transceiver stations (BTS) and the mobile stations (MS) forming a plurality of BTS-MS transmission paths, wherein an active set of base transceiver stations is determined with respect to at least one of the plurality of mobile stations, the method comprising the steps of:

creating an evaluation set of base transceiver stations corresponding to a mobile station;

evaluating reverse jamming effect in the plurality of BTS-MS paths, wherein the evaluation set is determined based on the evaluated reverse jamming effect, and includes base transceiver stations in the active set;

determining an affordable data rate for each base transceiver station in the evaluation set; and selecting a data rate from the affordable data rates of the base transceiver stations in the evaluation set.

22. A wireless system having a plurality of base transceiver stations operative to serve a plurality of mobile stations, the base transceiver stations (BTS) and the mobile stations (MS) forming a plurality of BTS-MS transmission paths, wherein an active set of base transceiver stations is determined with respect to at least one of the plurality of mobile stations, the system comprising:

an evaluation set of base transceiver stations corresponding to a mobile station;

means for evaluating reverse jamming effect in the plurality of BTS-MS paths, wherein the evaluation set is determined based on the evaluated reverse jamming effect, and includes base transceiver stations in the active set;

means for determining an affordable data rate for each base transceiver station in the evaluation set; and means for selecting a data rate from the affordable data rates of the base transceiver stations in the evaluation set.

* * * * *